(No Model.)
L. B. FRANCE.
MUSTACHE PROTECTOR.
No. 323,802. Patented Aug. 4, 1885.
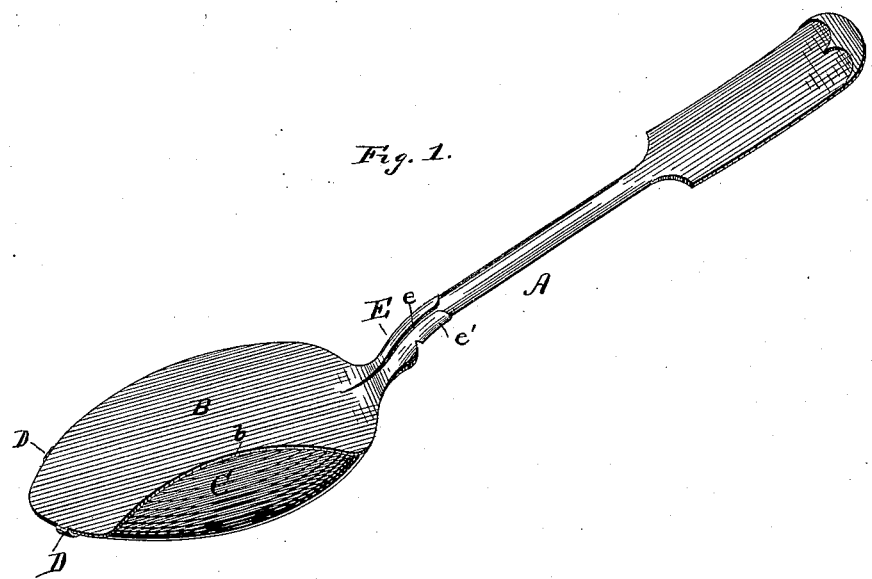
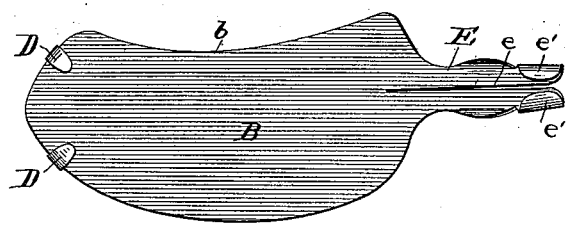

UNITED STATES PATENT OFFICE.

LEWIS B. FRANCE, OF DENVER, COLORADO.

MUSTACHE-PROTECTOR.

SPECIFICATION forming part of Letters Patent No. 323,802, dated August 4, 1885.

Application filed March 27, 1885. (No model.)

*To all whom it may concern:*

Be it known that I, LEWIS B. FRANCE, a citizen of the United States, residing at Denver, in the county of Arapahoe and State of Colorado, have invented certain new and useful Improvements in Mustache-Protectors; and I do hereby declare the following to be a full, clear, and exact description of the invention, such as will enable others skilled in the art to which it appertains to make and use the same.

My invention relates to certain improvements in mustache-protectors.

It consists of a removable plate conforming to the shape of the edge of the bowl and entirely covering said bowl, except on one side where the plate is cut away longitudinally, and forms with one edge of the spoon an elliptical opening through which food in a liquid or nearly liquid form can pass. Said plate or protector is secured to the spoon by means of a slitted spring-shank provided with lugs adapted to engage with the handle, and lugs on the end of the plate which engage with the end of the spoon. Its particular construction I will now proceed to point out and describe, reference being had to the accompanying drawings, in which—

Figure 1 is a perspective of a spoon provided with my invention. Fig. 2 is a bottom plan of the protector removed from the spoon.

Referring to said drawings, A is an ordinary spoon. B is a removable flat plate conforming on one side to the shape of the upper edge of the bowl, and cut away longitudinally on the opposite side at *b*. Said plate thus covers the bowl of the spoon, except on the side where it is cut away, at which side it forms, with one edge of the spoon, an elliptical opening, C, through which liquid can pass.

D D are lugs on one end of the plate, which engage with the end of the spoon.

E is a spring-shank slitted at *e*, and provided with lugs *e' e'*, which engage with the handle of the spoon and hold the plate securely in position. The plate is removed by releasing the lugs *e' e'* from the handle.

I am aware that mustache-protectors have been used which are removable from a spoon, and do not claim, broadly, such a device.

What I do claim as new, and desire to secure by Letters Patent, is—

A mustache-protector for spoons, consisting of the plate B, conforming on one side to the shape of edge of the bowl of a spoon and cut away longitudinally at *b*, and having the lugs D D and slitted spring-shank E, provided with the lugs *e' e'*, substantially as shown and described.

In testimony whereof I affix my signature in presence of two witnesses.

LEWIS B. FRANCE.

Witnesses:
SYLVANUS DAVIS,
CHAS. F. HALSTEAD.